United States Patent
Yi et al.

(10) Patent No.: US 11,883,795 B2
(45) Date of Patent: Jan. 30, 2024

(54) AMMONIA DECOMPOSITION CATALYST AND METHOD OF DECOMPOSING AMMONIA USING THE CATALYST

(71) Applicants: SAMSUNG ENGINEERING CO., LTD., Seoul (KR); EST CO., LTD., Daejeon (KR)

(72) Inventors: Jae Rim Yi, Seoul (KR); Sung Soo Lee, Seoul (KR); Sung Hun Hong, Seoul (KR); Jae Hun Hong, Seoul (KR); Sang Youp Hwang, Seoul (KR); Jae Kyeong Yoo, Seoul (KR); Sung Eun Jeoung, Seoul (KR); Jae Hoon Choi, Seoul (KR); Sang Bock Lee, Daejeon (KR); Jung Jae Kim, Sejong-si (KR)

(73) Assignees: SAMSUNG ENGINEERING CO., LTD., Seoul (KR); EST CO., LTD., Seoul (KR)

( * ) Notice: Subject to any disclaimer, the term of this patent is extended or adjusted under 35 U.S.C. 154(b) by 0 days.

(21) Appl. No.: 17/713,743

(22) Filed: Apr. 5, 2022

(65) Prior Publication Data
US 2022/0323940 A1 Oct. 13, 2022

(30) Foreign Application Priority Data

Apr. 6, 2021 (KR) .................. 10-2021-0044742

(51) Int. Cl.
*B01J 23/10* (2006.01)
*B01J 21/18* (2006.01)
(Continued)

(52) U.S. Cl.
CPC ............. *B01J 23/10* (2013.01); *B01J 21/066* (2013.01); *B01J 21/18* (2013.01); *B01J 35/1023* (2013.01); *C01B 3/047* (2013.01)

(58) Field of Classification Search
CPC . B01J 21/066; B01J 21/18; B01J 23/10; B01J 35/1023; B01J 35/1028; B01J 35/1061; B01D 53/8634; C01B 3/047
See application file for complete search history.

(56) References Cited

U.S. PATENT DOCUMENTS

2003/0121826 A1* 7/2003 Ding .................. B01J 23/83
502/180
2009/0060809 A1 3/2009 Shioya et al.
(Continued)

FOREIGN PATENT DOCUMENTS

EP 1116694 * 7/2001 ................ C02F 1/72
JP H08332490 A 12/1996
(Continued)

OTHER PUBLICATIONS

Hoigne, J. et al., 1978, Environmental Science and Technology, 12(1), 79-84. (Year: 1978).*
(Continued)

*Primary Examiner* — Brian A McCaig
(74) *Attorney, Agent, or Firm* — Panitch Schwarze Belisario & Nadel LLP

(57) ABSTRACT

Provided are an ammonia decomposition catalyst and a method of decomposing ammonia. The ammonia decomposition catalyst includes an activated carbon carrier and a metal loaded on the carrier, wherein a Brunauer, Emmett and Teller (BET) specific surface area of the carrier is about 850 m²/g or more, and the metal includes cerium (Ce).

3 Claims, 1 Drawing Sheet

(51) Int. Cl.
*C01B 3/04* (2006.01)
*B01J 35/10* (2006.01)
*B01J 21/06* (2006.01)

(56) References Cited

U.S. PATENT DOCUMENTS

2017/0113940 A1    4/2017  Lobo et al.
2020/0298210 A1*  9/2020  Yeung ................ B01J 35/1085

FOREIGN PATENT DOCUMENTS

| | | |
|---|---|---|
| JP | 2008216584 A | 9/2008 |
| KR | 970005540 B1 | 4/1997 |
| KR | 100889445 B1 | 3/2009 |
| KR | 20180069899 A | 6/2018 |
| KR | 20200011834 A | 2/2020 |

OTHER PUBLICATIONS

Korean Notice of Allowance in Korean Application No. 10-2021-0044742 dated Sep. 24, 2021 (2 pages).
Korean Office Action for Korean Application No. 10-2021-0044742 dated May 14, 2021.

* cited by examiner

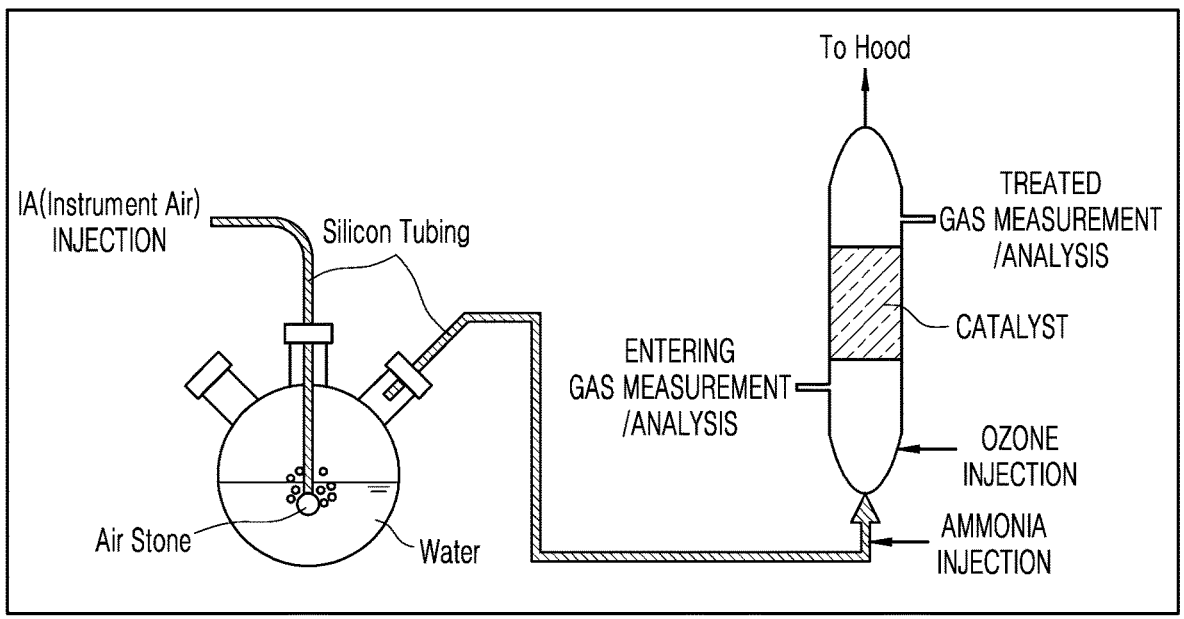

AMMONIA DECOMPOSITION CATALYST AND METHOD OF DECOMPOSING AMMONIA USING THE CATALYST

CROSS-REFERENCE TO RELATED APPLICATION

This application is based on and claims priority under 35 U.S.C. § 119 to Korean Patent Application No. 10-2021-0044742, filed on Apr. 6, 2021, in the Korean Intellectual Property Office, the disclosure of which is incorporated by reference herein in its entirety.

BACKGROUND

1. Field

The present invention relates to an ammonia decomposition catalyst and a method of decomposing ammonia using the catalyst, and more particularly, to an ammonia decomposition catalyst having excellent ammonia removing efficiency under conditions of high relative humidity and room temperature, and a method of decomposing ammonia using the catalyst.

2. Description of the Related Art

Ammonia is used in manufacturing processes of semiconductors, manufacturing processes of displays, etc. Since ammonia-containing gases are combustible and harmful, it is not allowed to discharge an ammonia-containing exhaust gas per se into the atmosphere in terms of environmental protection, and it is necessary to pretreat such a waste gas in order to remove its danger and harmfulness.

The treatment of an ammonia-containing exhaust gas may be performed by a wet process, a combustion process or a dry process. In the wet process, the exhaust gas is washed with a chemical solution. In the combustion process, the exhaust gas is burnt at high temperatures using a burner, etc to convert it into a harmless gas. In the dry process, the exhaust gas is passed through a vessel charged with a solid treatment agent or a decomposition catalyst to decompose the gas to convert it into a harmless substance. The dry process is employed generally in the treatment of exhaust gases such as metal hydride-containing gas, halide-containing gas or ammonia-containing gas.

However, in the wet process, waste water from the process contains ammonia, and thus it is necessary to treat this waste water. The combustion process also has a problem such that NOx generated from ammonia combustion needs to be further treated. Many techniques related to an ammonia decomposition catalyst for treating ammonia by the dry process have been known in the art. For example, as ammonia decomposition catalysts, copper oxide, chrome oxide, manganese oxide, iron oxide, palladium, platinum, etc; or metal elements of Group 8 and/or Group 1B in the periodic table of elements (sub-Group format) may be used.

However, although the decomposition catalysts prepared from copper oxide, chrome oxide, manganese oxide, iron oxide, palladium or platinum have excellent ammonia decomposability, these catalysts generate nitrogen oxides such as $N_2O$, $NO_2$, and NO as a side reaction, thereby causing further problems from an environmental standpoint.

The catalysts containing a metal element of Group 8 and/or Group 1B in the periodic table of elements (sub-Group format) may decompose ammonia at a low temperature under the coexistence of hydrogen as a reducing agent and may generate no nitrogen oxides; however, the coexistence of hydrogen is essential, which is disadvantageous in terms of cost.

In order to solve these problems, a catalyst which uses a porous silica alumina having a particular characteristics as a carrier on which at least one metal element selected from metal elements of Group 8 to Group 12 in the periodic table is impregnated in the pores of the porous silica alumina by ion exchange has been developed. This catalyst exhibits a sufficient performance in a space velocity (SV) range of 100 to 8,000 hr'. However, at a SV of 8,000 hr' or higher in case of the use of honeycomb, etc., the effective temperature range becomes 350° C. or higher. Thus, it is desirable to have a catalyst having excellent ammonia removing efficiency even at a large volumetric flow of exhaust gas and at a low temperature zone from the stand point of energy saving.

Moreover, since ammonia generated in the wastewater treatment plant of manufacturing processes of semiconductors or manufacturing processes of displays contain lots of moisture, development of a catalyst having high ammonia removing efficiency even under conditions of high relative humidity and room temperature is needed.

SUMMARY

An embodiment of the present invention provides an ammonia decomposition catalyst having excellent ammonia removing efficiency under conditions of high relative humidity and room temperature.

Another embodiment of the present invention provides a method of decomposing ammonia using the ammonia decomposition catalyst.

Additional aspects will be set forth in part in the description which follows and, in part, will be apparent from the description, or may be learned by practice of the presented embodiments of the disclosure.

According to an aspect of one or more embodiments, an ammonia decomposition catalyst includes:
an activated carbon carrier; and
a metal loaded on the carrier,
wherein a Brunauer, Emmett and Teller (BET) specific surface area of the carrier is 850 $m^2/g$ or more, and
the metal includes cerium (Ce).

The metal may be a combination of cerium (Ce) and zirconia (Zr).

An amount of Ce may be greater than an amount of Zr.

An amount of the metal may be in a range of about 0.15 parts to about 10 parts by weight based on 100 parts by weight of the carrier.

According to another aspect of one or more embodiments, a method of decomposing ammonia includes decomposing ammonia according to Reaction Scheme 1, wherein the method of decomposing ammonia is performed in the presence of ozone and the ammonia decomposition catalyst under conditions of relative humidity of about 70% or higher and room temperature of 30° C. or lower.

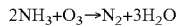   [Reaction Scheme 1]

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a schematic view of an apparatus for evaluating ammonia removing efficiency of an ammonia decomposition catalyst according to an embodiment of the present invention.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, an ammonia decomposition catalyst according to an embodiment of the present invention will be described in detail.

The ammonia decomposition catalyst according to an embodiment of the present invention includes an activated carbon carrier and a metal loaded on the carrier.

The ammonia decomposition catalyst is a catalyst that is developed to be used under particular conditions of relative humidity of about 70% or higher and room temperature of 30° C. or lower. That is, whether the ammonia decomposition catalyst has high ammonia removing efficiency under conditions of relative humidity lower than 70% or a temperature higher than 30° C. is not of interest to the present inventors.

In one embodiment, (1) a specific surface area of the carrier is 850 m²/g or more, and (2) the metal includes cerium (Ce).

When the ammonia decomposition catalyst does not satisfy any of the technical features (1) and (2), the ammonia removing efficiency under conditions of relative humidity of 70% or higher and room temperature of 30° C. or lower may be reduced to less than 50%.

In the present specification, the ammonia removing efficiency may be defined as in Equation 1.

Ammonia removing efficiency (%)=(amount of ammonia in untreated gas (vol ppm)−amount of ammonia in treated gas (vol ppm))/amount of ammonia in untreated gas (vol ppm)×100    [Equation 1]

In Equation 1, the "untreated gas" denotes gas before contacting the ammonia decomposition catalyst, and the "treated gas" denotes gas obtained after ammonia decomposition, which occurs as the untreated gas contacts the ammonia decomposition catalyst.

The metal may not include other metals selected from Ni, Cu, Co, Ru, Rh, Pd, Ir, and Pt. Therefore, the ammonia decomposition catalyst may have excellent ammonia removing efficiency despite not including the above-mentioned other metals. Further, when the metal loaded on the ammonia decomposition catalyst includes the other metals, excellent ammonia removing efficiency may not be achieved under conditions of relative humidity of 70% or higher and room temperature of 30° C. or lower even when the ammonia decomposition catalyst satisfy both the technical features (1) and (2).

For example, the metal may be a combination of Ce and zirconium (Zr). In this case, an amount of Ce may be greater than an amount of Zr. When the amount of Ce is less than that of Zr, the ammonia decomposition catalyst may not achieve excellent ammonia removing efficiency under conditions of relative humidity of 70% or higher and room temperature of 30° C. or lower.

Also, an amount of the metal may be in a range of 0.15 parts to 10 parts by weight based on 100 parts by weight of the carrier. When the amount of the metal is not in this range, the ammonia decomposition catalyst may not achieve excellent ammonia removing efficiency under conditions of relative humidity of 70% or higher and room temperature of 30° C. or lower.

A pore size of the activated carbon carrier may be in a range of 0.1 nm to 10 nm. When the pore size of the activated carbon carrier is within this range, ammonia-containing gas may easily pass the ammonia decomposition catalyst, and a contact area between the gas and the ammonia decomposition catalyst may increase.

The metal may be loaded on the carrier by any of ordinary ion exchange method, impregnation method, or isomorphous substitution method.

The metal may be loaded on the carrier in the form of nitrate, sulfate, acetate, chloride, ammonium complex salt, etc., but embodiments of the present invention are not limited thereto.

Hereinafter, the method of decomposing ammonia using the ammonia decomposition catalyst will be described in detail.

The method of decomposing ammonia may be performed in the presence of ozone and the ammonia decomposition catalyst.

Ozone may be included in the ammonia-containing untreated gas in a concentration in a range of 10 vol ppm (or ppm vol) to 100 vol ppm (or ppm vol).

Also, according to the method of decomposing ammonia, an ammonia decomposition reaction as in Reaction Scheme 1 may occur.

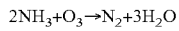    [Reaction Scheme 1]

Regarding Reaction Scheme 1, ozone ($O_3$) contacts with the ammonia decomposition catalyst to be decomposed into an oxygen anion ($O^-$) and oxygen ($O_2$), and the oxygen anion ($O^-$) contacts with ammonia ($NH_3$) to decompose ammonia and thus produce nitrogen ($N_2$) and water ($H_2O$).

Also, the method of decomposing ammonia may be performed under conditions of relative humidity of 70% or higher and room temperature of 30° C. or lower. In particular, the method of decomposing ammonia may be performed under conditions of relative humidity in a range of 70% to 80% and room temperature in a range of 0° C. to 30° C. When the method of decomposing ammonia is performed at a temperature lower than 0° C., vapor in the untreated gas is frozen, and thus the ammonia decomposition reaction may not occur, or even when the reaction occurs, the ammonia removing efficiency may be very low.

Also, in the method of decomposing ammonia, a space velocity (SV) of the untreated gas may be generally in a range of 100 hr⁻¹ to 80,000 hr', 200 hr⁻¹ to 20,000 hr⁻¹, or 400 hr⁻¹ to 10,000 hr⁻¹

Hereinafter, the present invention will be described with reference to the following examples, but the scope of the present invention is not limited to the examples.

Example 1: Preparation of Ammonia Decomposition Catalyst

A Ce compound ($Ce(NO_3)_3 \cdot 6H_2O$ 98% agent, 2.4 parts by weight based on Ce atoms) and a Zr compound ($Zr(SO_4)_2 \cdot 4H_2O$ 98% agent, 0.6 parts by weight based on Zr atoms) based on 100 parts by weight of a custom-made activated carbon (BET specific surface area: 850 m²/g, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 2: Preparation of Ammonia Decomposition Catalyst

A Ce compound ($Ce(NO_3)_3 \cdot 6H_2O$ 98% agent, 1.5 parts by weight based on Ce atoms) and a Zr compound ($Zr(SO_4)_2 \cdot 4H_2O$ 98% agent, 0.82 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 3: Preparation of Ammonia Decomposition Catalyst

A Ce compound ($Ce(NO_3)_3 \cdot 6H_2O$ 98% agent, 2.0 parts by weight based on Ce atoms) and a Zr compound ($Zr(SO_4)_2 \cdot 4H_2O$ 98% agent, 1.0 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 4: Preparation of Ammonia Decomposition Catalyst

A Ce compound ($Ce(NO_3)_3 \cdot 6H_2O$ 98% agent, 5.0 parts by weight based on Ce atoms) and a Zr compound ($Zr(SO_4)_2 \cdot 4H_2O$ 98% agent, 0.82 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 5: Preparation of Ammonia Decomposition Catalyst

A Ce compound ($Ce(NO_3)_3 \cdot 6H_2O$ 98% agent, 3.25 parts by weight based on Ce atoms) and a Zr compound ($Zr(SO_4)_2 \cdot 4H_2O$ 98% agent, 0.1 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 6: Preparation of Ammonia Decomposition Catalyst

A Ce compound ($Ce(NO_3)_3 \cdot 6H_2O$ 98% agent, 3.25 parts by weight based on Ce atoms) and a Zr compound ($Zr(SO_4)_2 \cdot 4H_2O$ 98% agent, 1.5 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 7: Preparation of Ammonia Decomposition Catalyst

A Ce compound ($Ce(NO_3)_3 \cdot 6H_2O$ 98% agent, 3.25 parts by weight based on Ce atoms) and a Zr compound ($Zr(SO_4)_2 \cdot 4H_2O$ 98% agent, 1.5 parts by weight based on Zr atoms) based on 100 parts by weight of a custom-made activated carbon (BET specific surface area: 1,000 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 8: Preparation of Ammonia Decomposition Catalyst

A Ce compound ($Ce(NO_3)_3 \cdot 6H_2O$ 98% agent, 3.25 parts by weight based on Ce atoms) and a Zr compound ($Zr(SO_4)_2 \cdot 4H_2O$ 98% agent, 1.5 parts by weight based on Zr atoms) based on 100 parts by weight of a custom-made activated carbon (BET specific surface area: 1,500 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 9: Preparation of Ammonia Decomposition Catalyst

A Ce compound ($Ce(NO_3)_3 \cdot 6H_2O$ 98% agent, 1.0 parts by weight based on Ce atoms) and a Zr compound ($Zr(SO_4)_2 \cdot 4H_2O$ 98% agent, 0.82 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 10: Preparation of Ammonia Decomposition Catalyst

A Ce compound ($Ce(NO_3)_3 \cdot 6H_2O$ 98% agent, 6.0 parts by weight based on Ce atoms) and a Zr compound ($Zr(SO_4)_2 \cdot 4H_2O$ 98% agent, 0.82 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 11: Preparation of Ammonia Decomposition Catalyst

A Ce compound ($Ce(NO_3)_3 \cdot 6H_2O$ 98% agent, 6.0 parts by weight based on Ce atoms) and a Zr compound ($Zr(SO_4)_2 \cdot 4H_2O$ 98% agent, 1.5 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 12: Preparation of Ammonia Decomposition Catalyst

A Ce compound ($Ce(NO_3)_3 \cdot 6H_2O$ 98% agent, 8.0 parts by weight based on Ce atoms) and a Zr compound ($Zr(SO_4)_2 \cdot 4H_2O$ 98% agent, 2.0 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 13: Preparation of Ammonia Decomposition Catalyst

A Ce compound ($Ce(NO_3)_3 \cdot 6H_2O$ 98% agent, 3.25 parts by weight based on Ce atoms) and a Zr compound ($Zr(SO_4)_2 \cdot 4H_2O$ 98% agent, 0.05 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 14: Preparation of Ammonia Decomposition Catalyst

A Ce compound ($Ce(NO_3)_3 \cdot 6H_2O$ 98% agent, 3.25 parts by weight based on Ce atoms) and a Zr compound ($Zr(SO_4)_2 \cdot 4H_2O$ 98% agent, 2.0 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Example 15: Preparation of Ammonia Decomposition Catalyst

A Ce compound ($Ce(NO_3)_3 \cdot 6H_2O$ 98% agent, 0.15 parts by weight based on Ce atoms) and a Zr compound ($Zr(SO_4)_2 \cdot 4H_2O$ 98% agent, 0.0375 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 1: Preparation of Ammonia Decomposition Catalyst

A Ce compound ($Ce(NO_3)_3 \cdot 6H_2O$ 98% agent, 0.6 parts by weight based on Ce atoms) and a Zr compound ($Zr(SO_4)_2 \cdot 4H_2O$ 98% agent, 1.2 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 2: Preparation of Ammonia Decomposition Catalyst

A Ce compound ($Ce(NO_3)_3 \cdot 6H_2O$ 98% agent, 0.6 parts by weight based on Ce atoms) and a Zr compound ($Zr(SO_4)_2 \cdot 4H_2O$ 98% agent, 2.4 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 3: Preparation of Ammonia Decomposition Catalyst

Only 100 parts by weight of a custom-made activated carbon (BET specific surface area: 850 $m^2/g$, pore size: 2.0 nm) was immersed in distilled water for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 4: Preparation of Ammonia Decomposition Catalyst

A Ce compound ($Ce(NO_3)_3 \cdot 6H_2O$ 98% agent, 0.2 parts by weight based on Ce atoms) and a Zr compound ($Zr(SO_4)_2 \cdot 4H_2O$ 98% agent, 2.0 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 5: Preparation of Ammonia Decomposition Catalyst

A Ce compound ($Ce(NO_3)_3 \cdot 6H_2O$ 98% agent, 0.1 parts by weight based on Ce atoms) and a Zr compound ($Zr(SO_4)_2 \cdot 4H_2O$ 98% agent, 0.025 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 6: Preparation of Ammonia Decomposition Catalyst

A Ce compound ($Ce(NO_3)_3 \cdot 6H_2O$ 98% agent, 0.1 parts by weight based on Ce atoms) based on 100 parts by weight of a custom-made activated carbon (BET specific surface area: 850 $m^2/g$, pore size: 2.0 nm) was dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 7: Preparation of Ammonia Decomposition Catalyst

A Zr compound ($Zr(SO_4)_2 \cdot 4H_2O$ 98% agent, 0.6 parts by weight based on Zr atoms) based on 100 parts by weight of a custom-made activated carbon (BET specific surface area: 850 $m^2/g$, pore size: 2.0 nm) was dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 8: Preparation of Ammonia Decomposition Catalyst

A Ce compound ($Ce(NO_3)_3 \cdot 6H_2O$ 98% agent, 10.0 parts by weight based on Ce atoms) and a Zr compound ($Zr(SO_4)_2 \cdot 4H_2O$ 98% agent, 2.5 parts by weight based on Zr atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 9: Preparation of Ammonia Decomposition Catalyst

A Ce compound ($Ce(NO_3)_3 \cdot 6H_2O$ 98% agent, 5.0 parts by weight based on Ce atoms), a Zr compound ($Zr(SO_4)_2 \cdot 4H_2O$ 98% agent, 5.0 parts by weight based on Zr atoms), and a Cu compound ($CuSO_4$ 98% agent, 2.0 parts by weight based on Cu atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 10: Preparation of Ammonia Decomposition Catalyst

A Cu compound ($CuSO_4$ 98% agent, 5.0 parts by weight based on Cu atoms) and a Ru compound ($RuCl_3$ 37% agent, 0.5 parts by weight based on Ru atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 11: Preparation of Ammonia Decomposition Catalyst

A Ni compound ($NiSO_4 \cdot 6H_2O$ 98.5% agent, 5.0 parts by weight based on Ni atoms) based on 100 parts by weight of a custom-made activated carbon (BET specific surface area: 850 $m^2/g$, pore size: 2.0 nm) was dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

Comparative Example 12: Preparation of Ammonia Decomposition Catalyst

A Ni compound ($NiSO_4 \cdot 6H_2O$ 98.5% agent, 2.0 parts by weight based on Ni atoms) and a Co compound ($CoSO_4 \cdot 7H_2O$ 98% agent, 2.0 parts by weight based on Co atoms) based on 100 parts by weight of a custom-made activated carbon (BET specific surface area: 850 $m^2/g$, pore size: 2.0 nm) were dissolved in distilled water to prepare an aqueous solution, and the activated carbon was immersed in the aqueous solution for 18 hours. Then, the resultant was dried in a drying oven at 115° C. for 10 hours to prepare a catalyst precursor. Next, the catalyst precursor was cooled down to prepare an ammonia decomposition catalyst.

The BET specific surface areas and pore sizes of the activated carbon and kinds and amount ratios of the metals used in Examples 1 to 15 and Comparative Examples 1 to 12 are shown in Table 1. In Table 1 below, the amounts of the metals are calculated based on amounts of the metal atoms with respect to 100 parts by weight of the activated carbon.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| BET specific surface area ($m^2/g$) | 850 | 850 | 850 | 850 | 850 | 850 | 1000 | 1500 | 850 | 850 |
| Pore size (nm) | 2 | 2 | 2 | 2 | 2 | 2 | 2 | 2 | 2 | 2 |
| Kind and amount of metal (part by weight) | Ce: 2.4 Zr: 0.6 | Ce: 1.5 Zr: 0.82 | Ce: 2.0 Zr: 1.0 | Ce: 5.0 Zr: 0.82 | Ce: 3.25 Zr: 0.1 | Ce: 3.25 Zr: 1.5 | Ce: 3.25 Zr: 1.5 | Ce: 3.25 Zr: 1.5 | Ce: 1.0 Zr: 0.82 | Ce: 6.0 Zr: 0.82 |

| | Example | | | | | Comparative Example | | | |
|---|---|---|---|---|---|---|---|---|---|
| | 11 | 12 | 13 | 14 | 15 | 1 | 2 | 3 | 4 |
| BET specific surface area ($m^2/g$) | 850 | 850 | 850 | 850 | 850 | 850 | 850 | 850 | 850 |
| Pore size (nm) | 2 | 2 | 2 | 2 | 2 | 2 | 2 | 2 | 2 |
| Kind and amount of metal (part by weight) | Ce: 6.0 Zr: 1.5 | Ce: 8.0 Zr: 2.0 | Ce: 3.25 Zr: 0.05 | Ce: 3.25 Zr: 2.0 | Ce: 0.15 Zr: 0.0375 | Ce: 0.6 Zr: 1.2 | Ce: 0.6 Zr: 2.4 | Ce: 0.0 Zr: 0.0 | Ce: 0.2 Zr: 2.0 |

| | Comparative Example | | | | | | | |
|---|---|---|---|---|---|---|---|---|
| | 5 | 6 | 7 | 8 | 9 | 10 | 11 | 12 |
| BET specific surface area ($m^2/g$) | 850 | 850 | 850 | 850 | 850 | 850 | 850 | 850 |
| Pore size (nm) | 2 | 2 | 2 | 2 | 2 | 2 | 2 | 2 |
| Kind and amount of metal (part by weight) | Ce: 0.1 Zr: 0.025 | Ce: 0.1 Zr: 0.0 | Ce: 0.0 Zr: 0.6 | Ce: 10.0 Zr: 2.5 | Ce: 5.0 Zr: 5.0 Cu: 2.0 | Cu: 5.0 Ru: 0.5 | Ni: 5.0 | Ni: 2.0 Co: 2.0 |

Evaluation Example: Evaluation of Ammonia Removing Efficiency of Ammonia Decomposition Catalyst Ammonia removing efficiency of the ammonia decomposition catalysts prepared in Examples 1 to 15 and Comparative Examples 1 to 12 were evaluated using an apparatus of FIG. 1. In FIG. 1, "IA" denotes Instrument Air.

Referring to FIG. 1, a 3-neck flask was filled with water, and an Air Stone was equipped at an end of an air injection tube to evenly disperse the introduced air into the 3-neck flask. The humid air formed in the 3-neck flask was supplied to a catalyst-charged vessel. Ozone and ammonia were injected to the catalyst-charged vessel. Then, ammonia decomposition reaction is caused by the action of ozone and the catalyst, and the resultant is discharged through a hood.

The catalyst-charged vessel includes an entering gas measuring/analyzing port and a treated gas measuring/analyzing port. In particular, after adding ozone and ammonia to the catalyst-charged vessel, concentrations at the front end and the back end of the catalyst were measured after 24 hours to evaluate ammonia discharging amount and ammonia removing efficiency (%). Here, the ammonia measurement was performed using a detector tube, and the ozone concentration measurement was performed using an ozone concentration meter. More particularly, a flowrate of "ammonia+ozone entering gas" passing the catalyst was 30 liter/minute, and an amount of the catalyst was 50 ml. Also, the relative humidity, temperature, and ammonia removing efficiency of the "ammonia+ozone entering gas" passing the catalyst are shown in Table 2.

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| Amount of ozone entered (vol ppm) | 60 | 60 | 60 | 60 | 60 | 60 | 60 | 60 | 60 | 60 |
| Amount of ammonia entered (vol ppm) | 20 | 20 | 20 | 20 | 20 | 20 | 20 | 20 | 20 | 20 |
| Relative humidity (%) | 70 to 80 | 70 to 80 | 70 to 80 | 70 to 80 | 70 to 80 | 70 to 80 | 70 to 80 | 70 to 80 | 70 to 80 | 70 to 80 |
| Temperature (° C.) | 30 | 30 | 30 | 30 | 30 | 30 | 30 | 30 | 30 | 30 |
| Amount of ammonia discharged (vol ppm) | 7 | 7.5 | 7.5 | 7.5 | 7.5 | 7.5 | 7.5 | 7.5 | 8 | 7.5 |
| Ammonia removing efficiency (%) | 65 | 63 | 63 | 63 | 63 | 63 | 63 | 63 | 60 | 63 |

| | Example | | | | | Comparative Example | | | |
|---|---|---|---|---|---|---|---|---|---|
| | 11 | 12 | 13 | 14 | 15 | 1 | 2 | 3 | 4 |
| Amount of ozone entered (vol ppm) | 60 | 60 | 60 | 60 | 60 | 60 | 60 | 60 | 60 |
| Amount of ammonia entered (vol ppm) | 20 | 20 | 20 | 20 | 20 | 20 | 20 | 20 | 20 |
| Relative humidity (%) | 70 to 80 | 70 to 80 | 70 to 80 | 70 to 80 | 70 to 80 | 70 to 80 | 70 to 80 | 70 to 80 | 70 to 80 |
| Temperature (° C.) | 30 | 30 | 30 | 30 | 30 | 30 | 30 | 30 | 30 |
| Amount of ammonia discharged (vol ppm) | 7 | 8 | 7.5 | 7.5 | 9 | 14 | 14 | 14 | 14 |
| Ammonia removing efficiency (%) | 65 | 60 | 63 | 63 | 55 | 30 | 30 | 30 | 30 |

| | Comparative Example | | | | | | | |
|---|---|---|---|---|---|---|---|---|
| | 5 | 6 | 7 | 8 | 9 | 10 | 11 | 12 |
| Amount of ozone entered (vol ppm) | 60 | 60 | 60 | 60 | 60 | 60 | 60 | 60 |
| Amount of ammonia entered (vol ppm) | 20 | 20 | 20 | 20 | 20 | 20 | 20 | 20 |
| Relative humidity (%) | 70 to 80 | 70 to 80 | 70 to 80 | 70 to 80 | 70 to 80 | 70 to 80 | 70 to 80 | 70 to 80 |
| Temperature (° C.) | 30 | 30 | 30 | 30 | 30 | 30 | 30 | 30 |
| Amount of ammonia discharged (vol ppm) | 14 | 13.5 | 14 | 12 | 18 | 15 | 20 | 12 |
| Ammonia removing efficiency (%) | 30 | 33 | 30 | 40 | 10 | 25 | 0 | 40 |

Referring to Table 2, it appeared that the ammonia decomposition catalysts prepared in Examples 1 to 15 had both excellent amount of ammonia discharged and excellent ammonia removing efficiency under conditions of relative humidity of about 70% or higher and room temperature of about 30° C. or lower in the presence of ozone as compared to those of the ammonia decomposition catalysts prepared in Comparative Examples 1 to 12.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An ammonia decomposition catalyst comprising:
an activated carbon carrier; and
a metal loaded on the carrier,
wherein a Brunauer, Emmett and Teller (BET) specific surface area of the carrier is 850 m²/g or more, and the metal consists of cerium (Ce) and zirconium (Zr),
wherein an amount of Ce is greater than an amount of Zr.

2. The ammonia decomposition catalyst of claim 1, wherein an amount of the metal is in a range of about 0.15 parts to about 10 parts by weight based on 100 parts by weight of the carrier.

3. A method of decomposing ammonia in an ammonia-containing gas according to Reaction Scheme 1,
wherein the method of decomposing ammonia in an ammonia-containing gas is performed under conditions of relative humidity of about 70% or higher and room temperature of about 30° C. or lower in the presence of ozone and the ammonia decomposition catalyst according to claim 1:

[Reaction Scheme 1]
$2NH_3 + O_3 \rightarrow N_2 + 3H_2O$.

* * * * *